United States Patent
Wu et al.

(10) Patent No.: US 11,579,907 B2
(45) Date of Patent: *Feb. 14, 2023

(54) ACCELERATION MANAGEMENT NODE, ACCELERATION NODE, CLIENT, AND METHOD

(71) Applicant: HUAWEI TECHNOLOGIES CO., LTD., Guangdong (CN)

(72) Inventors: Jianbang Wu, Hangzhou (CN); Peng Yuan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/376,305

(22) Filed: Jul. 15, 2021

(65) Prior Publication Data

US 2021/0342170 A1    Nov. 4, 2021

Related U.S. Application Data

(63) Continuation of application No. 16/852,408, filed on Apr. 18, 2020, now Pat. No. 11,080,076, which is a
(Continued)

(30) Foreign Application Priority Data

Sep. 28, 2015  (CN) .......................... 201510628762.0

(51) Int. Cl.
  *G06F 15/177* (2006.01)
  *G06F 9/455* (2018.01)
  (Continued)

(52) U.S. Cl.
  CPC ...... *G06F 9/45533* (2013.01); *H04L 41/5025* (2013.01); *H04L 65/40* (2013.01);
  (Continued)

(58) Field of Classification Search
  CPC ......... G06F 9/45533; G06F 2212/2542; H04L 41/5025; H04L 65/40
  (Continued)

(56) References Cited

U.S. PATENT DOCUMENTS 10,628,190 B2    4/2020   Wu et al.
11,080,076 B2    8/2021   Wu et al.
(Continued)

FOREIGN PATENT DOCUMENTS

CN    1965557 A      5/2007
CN    102148759 A    8/2011
(Continued)

OTHER PUBLICATIONS

Steve Crago et al., "Heterogeneous cloud computing" 2011 IEEE International Conference on Cluster Computing, dated 2011,total 8 pages.
(Continued)

*Primary Examiner* — Lan Dai T Truong

(57) ABSTRACT

Embodiments of the present application provide an acceleration management node. The acceleration management node separately receives acceleration device information of all acceleration devices. The acceleration device information includes an algorithm type, an acceleration bandwidth or non-uniform memory access architecture (NUMA). The acceleration management node obtains an invocation request from a client. The acceleration management node queries the acceleration device information to determine, from all the acceleration devices of the at least one acceleration node, a target acceleration device matching the invocation request. The acceleration management node further instructs a target acceleration node to respond to the invocation request.

18 Claims, 5 Drawing Sheets

Related U.S. Application Data continuation of application No. 15/937,864, filed on Mar. 28, 2018, now Pat. No. 10,068,190, which is a continuation of application No. PCT/CN2016/100137, filed on Sep. 26, 2016.

(51) Int. Cl.
  *H04L 67/10* (2022.01)
  *H04L 65/40* (2022.01)
  *H04L 67/1001* (2022.01)
  *H04L 41/5025* (2022.01)

(52) U.S. Cl.
  CPC .......... *H04L 67/10* (2013.01); *H04L 67/1001* (2022.05); *G06F 2212/2542* (2013.01)

(58) Field of Classification Search
  USPC ................................ 709/220, 223, 224, 250
  See application file for complete search history.

(56) References Cited

U.S. PATENT DOCUMENTS

| | | | |
|---|---|---|---|
| 2010/0058036 A1 | 3/2010 | Degenaro et al. | |
| 2014/0241247 A1 | 8/2014 | Kempf et al. | |
| 2016/0119198 A1 | 4/2016 | Kfir et al. | |
| 2016/0196221 A1 | 7/2016 | Wan | |
| 2016/0379109 A1* | 12/2016 | Chung | G06F 15/7803 706/26 |
| 2016/0379115 A1* | 12/2016 | Burger | G06F 15/7803 706/25 |
| 2017/0039089 A1 | 2/2017 | Xia et al. | |
| 2018/0083864 A1 | 3/2018 | Chen et al. | |
| 2018/0217856 A1 | 8/2018 | Wu et al. | |
| 2020/0293345 A1 | 9/2020 | Wu et al. | |

FOREIGN PATENT DOCUMENTS

| | | |
|---|---|---|
| CN | 102650950 A | 8/2012 |
| CN | 102685162 A | 9/2012 |
| CN | 103164215 A | 6/2013 |
| CN | 103458029 A | 12/2013 |
| CN | 103596066 A | 2/2014 |
| CN | 104050045 A | 9/2014 |
| CN | 104102546 A | 10/2014 |
| CN | 104348677 A | 2/2015 |
| CN | 104503728 A | 4/2015 |
| CN | 104657308 A | 5/2015 |
| CN | 104765613 A | 7/2015 |
| CN | 104899085 A | 9/2015 |
| CN | 104951353 A | 9/2015 |
| CN | 105357258 A | 2/2016 |
| EP | 2442228 A1 | 4/2012 |

OTHER PUBLICATIONS

Network Functions Virtualisation (NFV); Acceleration Technologies; Report on Acceleration Technologies and Use Cases; ETSI GS IFA 001, V0.7.0, Sep. 24, 2015, pp. 1-49, XP014263194.

ETSI GS NFV-INF 003 v1.1.1 (Dec. 2014), Network Functions Virtualisation (NFV); Infrastru cture; Compute Domain, Dec. 2014. total 57 pages.

Notice of Allowance issued in CN202010506699.4, dated Oct. 27, 2021, 5 pages.

* cited by examiner

ACCELERATION MANAGEMENT NODE, ACCELERATION NODE, CLIENT, AND METHOD

CROSS-REFERENCE TO RELATED APPLICATIONS

This application is a continuation of U.S. patent application Ser. No. 16/852,408, filed on Apr. 18, 2020, which is a continuation of a U.S. application Ser. No. 15/937,864, filed on Mar. 28, 2018, now U.S. Pat. No. 10,628,190, which is a continuation of an International Application No. PCT/CN2016/100137, filed on Sep. 26, 2016, which claims priority to Chinese Patent Application No. 201510628762.0, filed on Sep. 28, 2015. All of the afore-mentioned patent applications are hereby incorporated by reference in their entireties.

TECHNICAL FIELD

The present application relates to the field of virtualization technologies, and in particular, to an acceleration management node, an acceleration node, a client, and a method.

BACKGROUND

To shorten an execution time of an application program and improve the running efficiency, some services (or functions) in the program may be allocated to a hardware acceleration device for execution. Because the hardware acceleration device runs fast, the execution time of the application program can be shortened. Common accelerated services include encryption, decryption, compression, decompression, audio and video encoding and decoding, and the like. Hardware acceleration devices include a processor that provides special instructions, and other peripheral component interconnect (PCI) devices that can provide an acceleration function, such as a graphics processing unit (GPU) and a field programmable gate array (FPGA).

At present, network function virtualization (NFV) is proposed. The purpose of the NFV is to implement some network functions in general-purpose high-performance servers, switches, and storage devices through virtualization. In a NFV evolution scenario, a network device that is based on special-purpose hardware may be deployed on a general-purpose server by using the virtualization technology. A conventional combination of "embedded software+special-purpose hardware" is evolved into a combination of "software+general-purpose hardware." In order to implement hardware generalization, a network function (NF) program needs to be separated from conventional special-purpose hardware to form a virtualization network function (VNF) program, so that the conventional special-purpose hardware becomes general-purpose NFV hardware.

However, after forming the general-purpose NFV hardware, how to accurately schedule the NFV hardware according to a service requirement of an application program becomes a problem to be resolved.

SUMMARY

Embodiments of the present application provide an acceleration management node, an acceleration node, a client, and a method, applied to a virtualization scenario, so that an acceleration device can be accurately invoked according to a service requirement of a client.

According to a first aspect, an embodiment of the present application provides an acceleration management node. The acceleration management node includes a receiving unit, configured to separately receive, from at least one acceleration node, acceleration device information of all acceleration devices of the acceleration node. Each acceleration node includes at least one acceleration device. The acceleration device information includes an acceleration type and an algorithm type. The acceleration management node also includes an obtaining unit, configured to obtain an invocation request from a client. The invocation request is used to invoke an acceleration device to accelerate a service of the client, and the invocation request includes a target acceleration type and a target algorithm type. The acceleration management node further includes an allocation unit, configured to query the acceleration device information to determine, from all the acceleration devices of the at least one acceleration node, a target acceleration device matching the invocation request. The acceleration management node additionally includes an instruction unit, configured to instruct a target acceleration node on which the target acceleration device is located to respond to the invocation request. The acceleration management node invokes an acceleration device according to acceleration device information in each acceleration node and may allocate, according to a requirement of an application program of a client and an acceleration type and an algorithm type of each acceleration device, a corresponding acceleration device to the application program, so as to meet a service requirement.

In a first possible implementation manner of the first aspect, the allocation unit is configured to query the acceleration device information to determine, from all the acceleration devices of the at least one acceleration node, the target acceleration device whose acceleration type and algorithm type are respectively the same as the target acceleration type and the target algorithm type. When invoking an acceleration device according to acceleration device information in each acceleration node, the acceleration management node performs invocation according to an acceleration type, an algorithm type, and acceleration bandwidth of each acceleration device, so as to ensure that bandwidth of the acceleration device can meet a service requirement, thereby implementing accurate invocation.

With reference to the first aspect or the first possible implementation manner of the first aspect, in a second possible implementation manner, the acceleration information further includes acceleration bandwidth, and the acceleration bandwidth includes total bandwidth and occupied bandwidth; the invocation request further includes target acceleration bandwidth. The allocation unit is further configured to query the acceleration device information to determine at least one candidate acceleration device whose acceleration type and algorithm type are respectively the same as the target acceleration type and the target algorithm type and whose remaining bandwidth is greater than or equal to the target acceleration bandwidth. The allocation unit determines one of the at least one candidate acceleration device as the target acceleration device, where the remaining bandwidth is obtained by calculation according to the total bandwidth and the occupied bandwidth.

With reference to the second possible implementation manner of the first aspect, in a third possible implementation manner, the acceleration device information further includes non-uniform memory access architecture (NUMA) information. The invocation request further includes target NUMA information. The allocation unit is further configured to query the acceleration device information to determine at least one candidate acceleration device whose acceleration type and algorithm type are respectively the same as the target acceleration type and the target algorithm type, whose remaining bandwidth is greater than or equal to the target acceleration bandwidth, and whose NUMA information is consistent with the target NUMA information. The allocation unit determines one of the at least one candidate acceleration device as the target acceleration device, where the remaining bandwidth is obtained by calculation according to the total bandwidth and the occupied bandwidth.

With reference to either of the second possible implementation manner and the third possible implementation manner of the first aspect, in a fourth possible implementation manner, the allocation unit is further configured to: when there is one candidate acceleration device, determine the candidate acceleration device as the target acceleration device.

With reference to any one of the second to fourth possible implementation manners of the first aspect, in a fifth possible implementation manner, the allocation unit is further configured to: when there is a plurality of candidate acceleration devices, determine a first acceleration device having maximum remaining bandwidth from the plurality of candidate acceleration devices according to the acceleration bandwidth. If there is one first acceleration device, the allocation unit determines the first acceleration device as the target acceleration device.

With reference to the fifth possible implementation manner of the first aspect, in a sixth possible implementation manner, the allocation unit is further configured to: when there is a plurality of first acceleration devices having the maximum remaining bandwidth, determine a second acceleration device having a maximum VF quantity from the plurality of first acceleration devices according to the VF quantity. If there is one second acceleration device, the allocation unit uses the second acceleration device as the target acceleration device.

With reference to the sixth possible implementation manner of the first aspect, in a seventh possible implementation manner, the allocation unit is further configured to: when there is a plurality of second acceleration devices having the maximum VF quantity, use a second acceleration device first found as the target acceleration device according to a time sequence of querying the acceleration device information.

With reference to any one of the first aspect or the first to seventh possible implementation manners of the first aspect, in an eighth possible implementation manner, the instruction unit is further configured to send configuration instruction message to the target acceleration node. The configuration instruction message instructs the target acceleration node to respond to the invocation request. The configuration instruction message indicates an acceleration type and an algorithm type of the target acceleration device matching the invocation request, or the configuration instruction message indicates an acceleration type, an algorithm type, and acceleration bandwidth of the target acceleration device.

With reference to any one of the first aspect or the first to eighth possible implementation manners of the first aspect, in a ninth possible implementation manner, the acceleration management node further includes a storage unit, configured to store the acceleration device information.

With reference to any one of the second to ninth possible implementation manners of the first aspect, in a tenth possible implementation manner, the storage unit is further configured to: update previously stored acceleration device information corresponding to the target acceleration device according to the target acceleration bandwidth; and record an allocation result of the instruction unit.

With reference to any one of the first aspect or the first to tenth possible implementation manners of the first aspect, in an eleventh possible implementation manner, the acceleration management node further includes a releasing unit. The releasing unit is configured to obtain a release request from the client for releasing the target acceleration device, and invoke the target acceleration node to release the target acceleration device.

With reference to the eleventh possible implementation manner of the first aspect, in a twelfth possible implementation manner, the releasing unit is configured to: when detecting that the service of the client becomes abnormal, find the target acceleration device according to the allocation result recorded by the storage unit. The releasing unit invokes the target acceleration node to release the target acceleration device.

With reference to any one of the ninth to twelfth possible implementation manners of the first aspect, in a thirteenth possible implementation manner, the storage unit is further configured to set the allocation result to invalid.

According to a second aspect, an embodiment of the present application provides an acceleration node. The acceleration node includes an agent unit, a driver, and at least one acceleration device. The driver is configured to drive the at least one acceleration device. The at least one acceleration device is configured to provide a hardware acceleration function. The agent unit is configured to: invoke the driver to separately query the at least one acceleration device to obtain acceleration device information of each acceleration device, where the acceleration device information includes an acceleration type and an algorithm type; and report the acceleration device information to an acceleration management node. The acceleration node reports acceleration device information of its acceleration devices to the acceleration management node, so that the acceleration management node can configure an appropriate acceleration device for a client according to the reported acceleration device information, thereby meeting a service requirement and implementing accurate invocation.

In a first possible implementation manner of the second aspect, the acceleration device information further includes acceleration bandwidth.

With reference to the second aspect or the first possible implementation manner of the second aspect, in a second possible implementation manner, the agent unit is further configured to: receive a configuration instruction message from the acceleration management node. The configuration instruction message indicates a target acceleration type and a target algorithm type of a target acceleration device matching an invocation request of a client. Alternatively, the configuration instruction message indicates a target acceleration type, a target algorithm type, and target acceleration bandwidth of a target acceleration device matching an invocation request of a client. The agent unit invokes, according to the configuration instruction message, the driver to detect whether the target acceleration device works normally. When the target acceleration device works normally, the agent unit configures a target interface of the target acceleration device for the client.

With reference to any one of the second aspect or the first to second possible implementation manners of the second aspect, in a third possible implementation manner, the acceleration device information further includes non-uniform memory access architecture (NUMA) information.

With reference to the third possible implementation manner of the second aspect, in a fourth possible implementation manner, the configuration instruction message further indicates target NUMA information matching the invocation request of the client.

With reference to any one of the second to fourth possible implementation manners of the second aspect, in a fifth possible implementation manner, the agent unit is further configured to configure the target acceleration type, the target algorithm type, and the target acceleration bandwidth as a hardware attribute of the target interface.

With reference to any one of the second to fifth possible implementation manners of the second aspect, in a sixth possible implementation manner, the agent unit is further configured to respond to the acceleration management node and release the target acceleration device.

With reference to the sixth possible implementation manner of the second aspect, in a seventh possible implementation manner, the agent unit is further configured to set the hardware attribute of the target interface to null.

According to a third aspect, an embodiment of the present application provides a client. The client includes a requesting unit, configured to generate an invocation request according to an acceleration requirement of a service. The invocation request includes a target acceleration type and a target algorithm type that are required for accelerating the service. The client also includes a sending unit, configured to send the invocation request to an acceleration management node to request to invoke a target acceleration device matching the invocation request to accelerate the service. An application program of the client may send, to the acceleration management node, a target acceleration type and a target algorithm type. The target acceleration type and the target algorithm type correspond to an acceleration device that meets a requirement of accelerating a service of the application program. The application program applies to the acceleration management node for the acceleration device, so that the acceleration management node can more accurately invoke a target acceleration device required by the client.

In a first possible implementation manner of the third aspect, the invocation request further includes target acceleration bandwidth required for accelerating the service.

With reference to the third aspect or the first possible implementation manner of the third aspect, in a second possible implementation manner, the invocation request further includes target NUMA information required by the service.

With reference to any one of the third aspect or the first to second possible implementation manners of the third aspect, in a third possible implementation manner, the requesting unit is further configured to: when the client needs to release the acceleration device, generate a release request for releasing the target acceleration device. The sending unit is further configured to send the release request to the acceleration management node.

According to a fourth aspect, an embodiment of the present application provides an acceleration management method. The method includes separately receiving, from at least on acceleration node, acceleration device information of all acceleration devices of the acceleration node. Each acceleration node includes at least one acceleration device, and the acceleration device information includes an acceleration type and an algorithm type. The method further includes obtaining an invocation request from a client. The invocation request is used to invoke an acceleration device to accelerate a service of the client. The invocation request includes a target acceleration type and a target algorithm type. The method further includes querying the acceleration device information to determine, from all the acceleration devices of the at least one acceleration node, a target acceleration device matching the invocation request; and instructing a target acceleration node on which the target acceleration device is located to respond to the invocation request. By obtaining acceleration device information of each acceleration node and invoking an acceleration device, an acceleration management node may allocate, according to a requirement of an application program of a client and an acceleration type and an algorithm type of each acceleration device, a corresponding acceleration device to the application program. The method ensures normal running of the accelerated service and implements accurate invocation.

In a first possible implementation manner of the fourth aspect, the step of querying the acceleration device information to determine a target acceleration device includes: querying the acceleration device information to determine the target acceleration device whose acceleration type and algorithm type are respectively the same as the target acceleration type and the target algorithm type.

With reference to the fourth aspect or the first possible implementation manner of the fourth aspect, in a second possible implementation manner, the acceleration information further includes acceleration bandwidth. The acceleration bandwidth includes total bandwidth and occupied bandwidth. The invocation request further includes target acceleration bandwidth. The step of querying the acceleration device information to determine a target acceleration device includes: querying the acceleration device information to determine at least one candidate acceleration device. The acceleration type and algorithm type of the candidate acceleration device are respectively the same as the target acceleration type and the target algorithm type, and remaining bandwidth of the candidate acceleration device is greater than or equal to the target acceleration bandwidth. One of the at least one candidate acceleration devices is determined as the target acceleration device. The remaining bandwidth is obtained by calculation according to the total bandwidth and the occupied bandwidth.

With reference to the second possible implementation manner of the fourth aspect, in a third possible implementation manner, the acceleration device information further includes non-uniform memory access architecture (NUMA) information. The invocation request further includes target NUMA information. The step of querying the acceleration device information to determine, a target acceleration device specifically includes: querying the acceleration device information to determine at least one candidate acceleration device. The acceleration type and algorithm type of the at least one candidate acceleration device are respectively the same as the target acceleration type and the target algorithm type. Remaining bandwidth of the at least one candidate acceleration device is greater than or equal to the target acceleration bandwidth, and whose NUMA information is consistent with the target NUMA information. One of the at least one candidate acceleration device is determined as the target acceleration device, where the remaining bandwidth is obtained by calculation according to the total bandwidth and the occupied bandwidth.

With reference to either of the second possible implementation manner and the third possible implementation manner of the fourth aspect, in a fourth possible implementation manner, when there is one candidate acceleration device, the candidate acceleration device is determined as the target acceleration device. Alternatively, when there is a plurality of candidate acceleration devices, a first acceleration device having maximum remaining bandwidth is determined from the plurality of candidate acceleration devices according to the acceleration bandwidth, and if there is one first acceleration device, the first acceleration device is determined as the target acceleration device.

With reference to the fourth possible implementation manner of the fourth aspect, in a fifth possible implementation manner, the acceleration device information further includes a virtual function (VF) quantity. When there is a plurality of first acceleration devices having the maximum remaining bandwidth, a second acceleration device having a maximum VF quantity is determined from the plurality of first acceleration devices, and if there is one second acceleration device, the second acceleration device is used as the target acceleration device.

With reference to the fifth possible implementation manner of the fourth aspect, in a sixth possible implementation manner, when there is a plurality of second acceleration devices having the maximum VF quantity, a second acceleration device first found is used as the target acceleration device according to a time sequence of querying the acceleration device information.

With reference to any one of the fourth aspect or the first to sixth possible implementation manners of the fourth aspect, in a seventh possible implementation manner, the method further includes: storing the acceleration device information.

With reference to any one of the second to seventh possible implementation manners of the fourth aspect, in an eighth possible implementation manner, the method further includes: updating previously stored acceleration device information corresponding to the target acceleration device according to the target acceleration bandwidth; and recording an allocation result.

With reference to any one of the fourth aspect or the first to eighth possible implementation manners of the fourth aspect, in a ninth possible implementation manner, the method further includes: obtaining a release request from the client for releasing the target acceleration device, and invoking the target acceleration node to release the target acceleration device.

With reference to the ninth possible implementation manner of the fourth aspect, in a tenth possible implementation manner, the method further includes: when detecting that the service of the client becomes abnormal, finding the target acceleration device according to the recorded allocation result, and invoking the target acceleration node to release the target acceleration device.

With reference to any one of the eighth to tenth possible implementation manners of the fourth aspect, in an eleventh possible implementation manner, the method further includes: setting the allocation result to invalid.

According to a fifth aspect, an embodiment of the present application provides an acceleration device configuration method that is applied to an acceleration node. The acceleration node includes a driver and at least one acceleration device. The method includes: invoking the driver to separately query the at least one acceleration device to obtain acceleration device information of each acceleration device, where the acceleration device information includes an acceleration type and an algorithm type; and reporting the acceleration device information to an acceleration management node. The acceleration node reports acceleration device information of its acceleration devices to the acceleration management node, so that the acceleration management node can configure an appropriate acceleration device for a client according to the reported acceleration device information, thereby meeting a service requirement and implementing accurate invocation.

In a first possible implementation manner of the fifth aspect, the acceleration device information further includes acceleration bandwidth.

With reference to the fifth aspect or the first possible implementation manner of the fifth aspect, in a second possible implementation manner, the method further includes: receiving a configuration instruction message from the acceleration management node. The configuration instruction message indicates a target acceleration type and a target algorithm type of a target acceleration device matching an invocation request of a client. Alternatively, the configuration instruction message indicates a target acceleration type, a target algorithm type, and target acceleration bandwidth of a target acceleration device matching an invocation request of a client. The method further includes invoking, according to the configuration instruction message, the driver to detect whether the target acceleration device works normally; and when the target acceleration device works normally, configuring a target interface of the target acceleration device for the client.

With reference to the fifth aspect or the second possible implementation manner of the fifth aspect, in a third possible implementation manner, the acceleration device information further includes non-uniform memory access architecture (NUMA) information.

With reference to the third possible implementation manner of the fifth aspect, in a fourth possible implementation manner, the configuration instruction message further indicates target NUMA information matching the invocation request of the client.

With reference to either of the second possible implementation manner and the fourth possible implementation manner of the fifth aspect, in a fifth possible implementation manner, the method further includes: configuring the target acceleration type, the target algorithm type, and the target acceleration bandwidth as a hardware attribute of the target interface.

With reference to any one of the second to fifth possible implementation manners of the fifth aspect, in a sixth possible implementation manner, the method further includes: responding to the acceleration management node and releasing the target acceleration device.

With reference to the sixth possible implementation manner of the fifth aspect, in a seventh possible implementation manner, the method further includes: setting the hardware attribute of the target interface to null.

According to a sixth aspect, an embodiment of the present application provides a method of applying for an acceleration device. The method includes: generating an invocation request according to an acceleration requirement of a service. The invocation request includes a target acceleration type and a target algorithm type that are required for accelerating the service. The method further includes sending the invocation request to an acceleration management node to request to invoke a target acceleration device matching the invocation request to accelerate the service. An application program of a client may send, to the acceleration management node, a target acceleration type and a target algorithm type that correspond to an acceleration device that meets a requirement of accelerating a service of the application program. The application program applies to the acceleration management node for the acceleration device, so that the acceleration management node can more accurately invoke a target acceleration device required by the client, and ensure normal running of the service.

In a first possible implementation manner of the sixth aspect, the invocation request further includes target acceleration bandwidth required for accelerating the service.

With reference to the sixth aspect or the first possible implementation manner of the sixth aspect, in a second possible implementation manner, the invocation request further includes target NUMA information required by the service.

With reference to any one of the sixth aspect or the first to second possible implementation manners of the sixth aspect, in a third possible implementation manner, the method further includes: when the acceleration of the service is completed, generating a release request for releasing the target acceleration device; and sending the release request to the acceleration management node.

According to a seventh aspect, an embodiment of the present application provides an acceleration management system. The acceleration management system includes the acceleration management node according to any one of the first aspect or the first to thirteenth possible implementation manners of the first aspect and the acceleration node according to any one of the second aspect or the first to seventh possible implementation manners. The acceleration management system can accurately invoke, according to a service requirement of an application program of a client, an appropriate acceleration device to accelerate a service of the application program and ensure normal running of the service.

BRIEF DESCRIPTION OF DRAWINGS

The following briefly introduces the accompanying drawings used in describing the embodiments.

DESCRIPTION OF EMBODIMENTS

The following describes the technical solutions in the embodiments of the present application with reference to the accompanying drawings.

Figure 1:
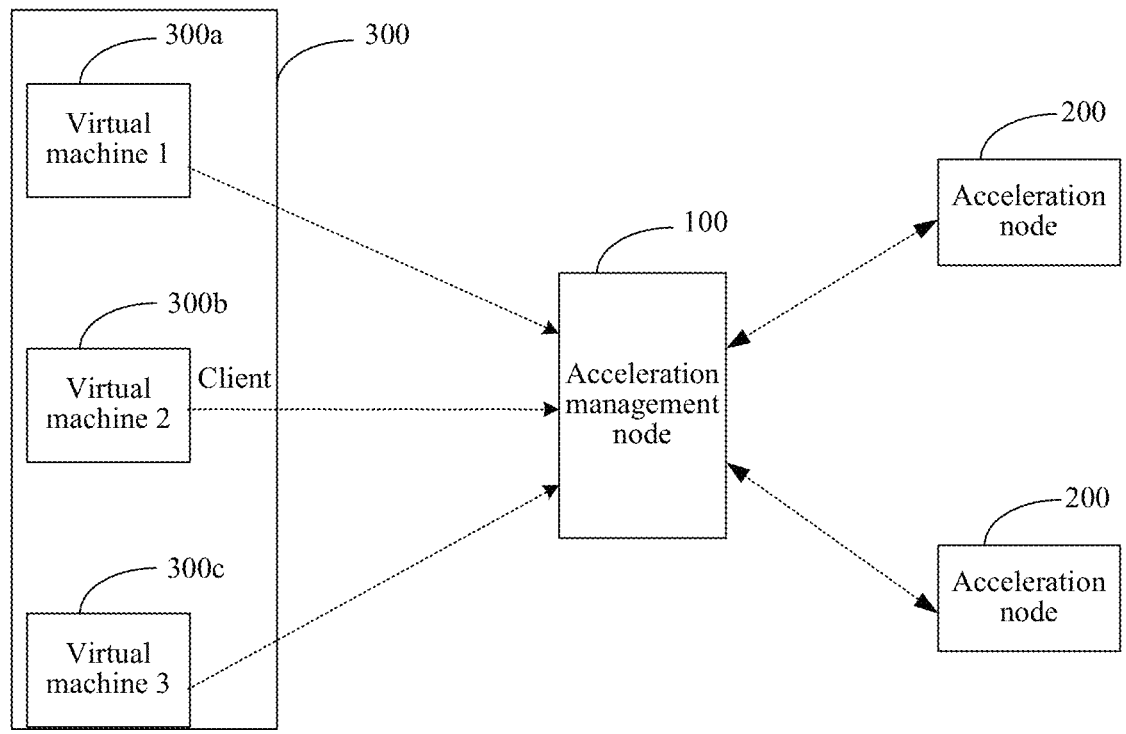
FIG. 1 is a schematic diagram of an application scenario of virtualization technology.

First, the technical solutions of the present application may be applied to various virtualization scenarios. Virtualization refers to virtualizing one computer into a plurality of logical computers. For example, as shown in FIG. 1, a computation management module (not shown) in a client 300 (also referred to as a computer or a physical host) may create one or more virtual machines according to a user requirement. For example, FIG. 1 shows three virtual machines in the client 300, namely, virtual machine 300a, virtual machine 300b, and virtual machine 300c. The virtual machines may run on different operating systems. Each virtual machine may be considered as a logical computer. Because all application programs of the virtual machines can run in mutually independent spaces without affecting each other, the working efficiency of the client 300 is significantly improved. In FIG. 1, an acceleration node 200 may include general-purpose computer hardware, that is, an acceleration device such as a central processing unit (CPU) or a graphics processing unit (GPU), and each virtual machine in the client 300 may invoke the acceleration device in the acceleration node 200 by using an acceleration management node 100. Network function virtualization (NFV) uses general-purpose hardware such as x86 and a virtualization technology to implement software processing of a lot of functions, so as to reduce network device costs. NFV may be considered as an application of the virtualization technology. In addition, the virtualization technology may also be applied in scenarios such as public cloud, private cloud, enterprise cloud, and cloud acceleration. Therefore, the solutions of the embodiments of the present application are not limited to an NFV scenario, and the protection scope of the present application should not be limited thereto.

To better describe the technical solutions of the present application, the technical solutions of the present application are described in detail below with reference to FIG. 2 to FIG. 4.

Figure 2:
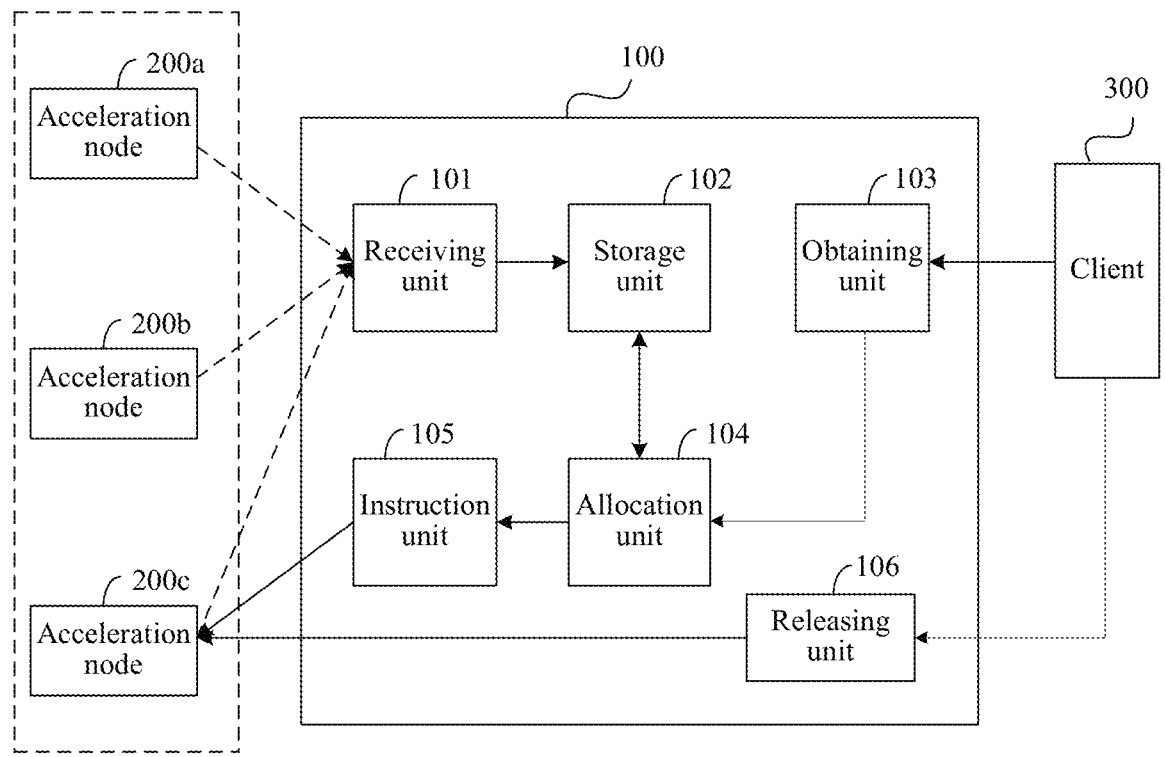
FIG. 2 is a schematic block diagram of an acceleration management node according to an embodiment of the present application.

FIG. 2 is a schematic block diagram of an acceleration management node 100 according to an embodiment of the present application. The acceleration management node 100 includes a receiving unit 101, an obtaining unit 103, an allocation unit 104, and an instruction unit 105.

The receiving unit 101 is configured to separately receive, from at least one acceleration nodes, acceleration device information of all acceleration devices of the acceleration node. Each acceleration node includes at least one acceleration device. The acceleration device information of the acceleration device includes an acceleration type and an algorithm type of the acceleration device. The acceleration type indicates a type of an acceleration function supported by the acceleration device. Common acceleration functions may include encryption, decryption, compression, decompression, audio and video encoding and decoding, and the like. The algorithm type indicates an algorithm used by the acceleration device in executing an acceleration function supported by the acceleration device.

To better describe the technical solutions of the present application, as an example shown in FIG. 2, in some virtualization scenarios, three acceleration nodes, namely, acceleration node 200a, acceleration node 200b, and acceleration node 200c, are used. An actual quantity of acceleration nodes may be set according to a network requirement. No limitation is imposed herein. Each acceleration node may include at least one hardware acceleration device such as a CPU, a GPU, or a peripheral component interconnect (PCI) device. Each acceleration device has its own acceleration type, algorithm type, and the like. That is, each acceleration device corresponds to one piece of acceleration device information. Different acceleration devices may correspond to same or different acceleration device information. When an acceleration node includes two acceleration devices, namely, a CPU and a GPU, the acceleration node may separately report acceleration device information of the CPU and acceleration device information of the GPU to the acceleration management node 100 through the receiving unit 101. In addition, the receiving unit 101 may be a reporting interface and may specifically include a software interface. For example, the acceleration node 200*a* may invoke the reporting interface in a Remote Procedure Call Protocol (RPC) manner, to report the acceleration device information of all the acceleration devices in the acceleration node 200*a* to the acceleration management node 100. The other acceleration nodes 200*b* and 200*c* are similar to the acceleration node 200*a*, and details are not described herein again.

The acceleration management node 100 in this embodiment of the present application may be a management program running on a physical host. The physical host may include a processor, a memory, and an input/output (I/O) interface. The management program is stored in the memory. The processor can read and run the management program stored in the memory. Further, the receiving unit 101 may be a software I/O interface, and the acceleration node may use various communications tools (for example, a communications tool Rabbit MQ) between software I/O interfaces to remotely invoke the software I/O interface for communication. The communication may also be performed between software I/O interfaces by using various other message queues. No specific limitation is imposed herein.

The obtaining unit 103 is configured to obtain an invocation request from a client 300. The invocation request is used to invoke an acceleration device to accelerate a service of the client 300, and the invocation request includes a target acceleration type and a target algorithm type.

The client 300 may specifically be a physical host that runs an application program. When a service (or function) of the application program needs to be accelerated, the application program of the client 300 notifies, through the obtaining unit 103, the acceleration management node 100 of information, such as a target acceleration type and a target algorithm type, of an acceleration device requested for accelerating the service. By doing so, the application program applies to the acceleration management node 100 for a hardware resource (that is, an acceleration device) for acceleration. The obtaining unit 103 may also be an application programming interface (API). The application program of the client 300 may communicate with the obtaining unit 103 by invoking the application programming interface. Each type of service of the application program requires a target acceleration type and a target algorithm type that comply with its service specification.

The allocation unit 104 is configured to query the acceleration device information to determine, from all the acceleration devices of the at least one acceleration node, a target acceleration device matching the invocation request.

After obtaining the invocation request from the client 300, the allocation unit 104 searches acceleration device information of all acceleration nodes that is stored in a storage unit 102, for a target acceleration device that meets the target acceleration type and the target algorithm type required by the invocation request.

The instruction unit 105 is configured to instruct a target acceleration node, on which the target acceleration device is located, to respond to the invocation request and configure the target acceleration device for the client 300.

Optionally, the acceleration management node 100 further includes the storage unit 102, configured to store the acceleration device information.

The storage unit 102 may store the obtained acceleration device information in a local memory of the acceleration management node 100 or in a network memory connected to the acceleration management node 100 through a network. No limitation is imposed herein. In addition, the storage unit 102 may store the acceleration device information in a list form, a database form, or another storage form known to persons skilled in the art.

For example, after the client 300 requests the acceleration management node 100 to invoke an acceleration device, the acceleration management node 100 determines, by querying the acceleration device information obtained from the acceleration nodes 200*a*, 200*b*, and 200*c*, that a target acceleration device required for meeting the invocation request of the client 300 is located on the acceleration node 200*c*. In this case, the instruction unit 105 may invoke a configuration interface of the acceleration node 200*c* in an RPC manner to allocate the target acceleration type and the target algorithm type to the acceleration node 200*c*. The acceleration node 200*c* configures the corresponding target acceleration device for the client 300, thereby providing a hardware acceleration function for the service of the application program of the client 300.

In this embodiment, the acceleration management node invokes an acceleration device according to acceleration device information in each acceleration node and may allocate, according to a requirement of an application program of a client and an acceleration type and an algorithm type of each acceleration device, a corresponding acceleration device to the application program. As known by persons skilled in the art, acceleration refers to allocating some services of an application program to a hardware acceleration device for operation. Because efficiency of logical operations of the hardware acceleration device is higher than that of a software algorithm, an operation time can be saved, thereby achieving acceleration. However, in the prior art, when an acceleration device is invoked, a specific acceleration type and algorithm type supported by the acceleration device are not considered. Using acceleration of encryption and decryption as an example, only an encryption and decryption type, such as IPSec, can be perceived in the prior art, and invocation is performed according to the encryption and decryption type IPSec. However, the encryption and decryption type IPSec further includes three sub-types, namely, triple data encryption algorithm (3DES), Diffie-Hellman (D-H or DH) algorithm, and advanced encryption standard (AES). In the prior art, an acceleration device of the IPSec-DH type may be invoked for a service that requires an acceleration device of the IPSec-3DES type, resulting in that an invocation result cannot meet the requirement of the service. Compared with the prior art, the technical solutions of the present application can ensure accuracy of an invocation result, so that an attribute of an acceleration device invoked by the client 300 can meet a requirement of an application program.

In this embodiment, the allocation unit 104 may be further configured to query the acceleration device information to determine, from all the acceleration devices of the at least one acceleration node, the target acceleration device whose acceleration type and algorithm type are respectively the same as the target acceleration type and the target algorithm type.

Further, in this embodiment, the acceleration information obtained by the receiving unit 101 may further include acceleration bandwidth. The acceleration bandwidth may include total bandwidth of an acceleration device and details of occupied bandwidth of the acceleration device at a current moment. The total bandwidth of the acceleration device refers to maximum acceleration bandwidth that can be provided by the acceleration device in a zero-load state. Correspondingly, the invocation request obtained by the obtaining unit 103 may further include target acceleration bandwidth. The target acceleration bandwidth indicates bandwidth required by a service for which acceleration is requested by the client 300.

In this embodiment, the acceleration bandwidth of each acceleration device includes the total bandwidth and the occupied bandwidth. The allocation unit 104 may first query the acceleration device information to obtain at least one candidate acceleration device whose acceleration type and algorithm type are respectively the same as the target acceleration type and the target algorithm type, and whose remaining bandwidth is greater than or equal to the target acceleration bandwidth. In other words, allocation unit 104 obtains at least one candidate acceleration device matching the invocation request, and determines one of the at least one candidate acceleration device as the target acceleration device. The remaining bandwidth is obtained by calculation according to the total bandwidth and the occupied bandwidth.

As can be seen, the acceleration management node 100 may allocate a corresponding acceleration device to the application program according to acceleration bandwidth of each acceleration device, so as to ensure that the allocated acceleration device can provide sufficient acceleration bandwidth for the application program, thereby implementing accurate invocation. However, in the prior art, the acceleration bandwidth of an acceleration device is not considered, and when remaining bandwidth of the acceleration device does not meet a service requirement, a prolonged acceleration time or an acceleration failure may also be caused, failing to achieve acceleration.

Further, when the acceleration node 200 uses a multi-processor architecture, the acceleration node 200 may provide a separate memory for each processor by using a non-uniform memory access architecture (NUMA), thereby avoiding performance loss caused by access of multiple processors to a same memory. Therefore, processors in the acceleration node 200 may be grouped according to NUMA information, and the processors in different groups have different NUMA information. In addition, the acceleration devices in the acceleration node 200 usually belong to different processors. Therefore, each acceleration device has same NUMA information as that of the processor to which the acceleration device belongs. Correspondingly, the acceleration device information obtained by the receiving unit 101 may further include NUMA information. Moreover, the client 300 and the acceleration node may be located on a same physical host, and a virtual machine on which the application program for which acceleration is requested by the client 300 is located also has same NUMA information as that of a processor to which the virtual machine belongs. Therefore, when invoking an acceleration device, the client 300 may also specify target NUMA information in the invocation request according to the requirement of the service of the application program. In other words, the client 300 may also specify the target NUMA information in the invocation request on the basis of ensuring that cross-NUMA access to a memory corresponding to another processor does not need to be performed during service acceleration. The allocation unit 105 may query the acceleration device information to determine at least one candidate acceleration device. The acceleration type and algorithm type of the at least one candidate acceleration device are respectively the same as the target acceleration type and the target algorithm type. Remaining bandwidth of the at least one candidate acceleration device is greater than or equal to the target acceleration bandwidth, and NUMA information of the at least one candidate acceleration device is consistent with the target NUMA information. The allocation unit 105 determines one of the at least one candidate acceleration device as the target acceleration device. The remaining bandwidth is obtained by calculation according to the total bandwidth and the occupied bandwidth. In such a manner, an acceleration device whose NUMA information is consistent with the target NUMA information can be scheduled to the client, so as to ensure that a process of the service and the acceleration device are on a same NUMA, thereby improving read/write performance during storage. This manner is also referred to as processor affinity scheduling. Refer to the prior art for details, and the details are not described herein.

Because there may be one or more candidate acceleration devices, when the allocation unit 104 determines a target acceleration device from the at least one candidate acceleration device, the following cases may be included.

(1) When there is one candidate acceleration device, the candidate acceleration device is determined as the target acceleration device.

(2) When there is a plurality of candidate acceleration devices, the allocation unit determines a first acceleration device having maximum remaining bandwidth from the plurality of candidate acceleration devices according to the acceleration bandwidth. If there is one first acceleration device, the first acceleration device is determined as the target acceleration device. The remaining bandwidth of the candidate acceleration device is obtained by calculation according to the total bandwidth and the occupied bandwidth. In addition, in this embodiment, if a third acceleration device whose remaining bandwidth is approximately equal to the target acceleration bandwidth exists in the plurality of candidate acceleration devices, the third acceleration device may also be determined as the target acceleration device. Being approximately equal refers to that a slight difference in value is allowed.

(3) When there is a plurality of candidate acceleration devices, and there is a plurality of first acceleration devices having the maximum remaining bandwidth in the plurality of the candidate acceleration devices, the acceleration device information reported by the acceleration node 200 to the acceleration management node 100 further includes a virtual function (VF) quantity. The allocation unit determines a second acceleration device having a maximum VF quantity from the plurality of first acceleration devices according to the VF quantity, and if there is one second acceleration device, uses the second acceleration device as the target acceleration device.

(4) When there is a plurality of candidate acceleration devices, and there is a plurality of first acceleration devices having the maximum remaining bandwidth in the plurality of the candidate acceleration devices, if there is a plurality of second acceleration devices having the maximum VF quantity, the allocation unit uses a second acceleration device first found as the target acceleration device according to a time sequence of querying the acceleration device information.

In the foregoing manner, the acceleration management node 100 can determine an optimal target acceleration device for the client 300, and invoke the optimal target acceleration device for the client 300, thereby implementing accurate invocation.

In this embodiment, for example, specifically, the instruction unit 105 may send a configuration instruction message to the target acceleration node, to instruct the target acceleration node to respond to the invocation request. The configuration instruction message is used to instruct the target acceleration node to configure the target acceleration device for the client 300. The configuration instruction message may specifically indicate an acceleration type and an algorithm type of the target acceleration device matching the invocation request, or the configuration instruction message indicates an acceleration type, an algorithm type, and acceleration bandwidth of the target acceleration device.

Further, in this embodiment, the storage unit 102 may further be configured to update previously stored acceleration device information corresponding to the target acceleration device according to the target acceleration bandwidth. The storage unit 102 stores acceleration bandwidth of the target acceleration device before the target acceleration device is configured for the client 300. The acceleration bandwidth includes total bandwidth and details of unoccupied bandwidth of the target acceleration device before the target acceleration device is configured. After the target acceleration device is configured for the client 300 to provide hardware acceleration for the service of the client 300, correspondingly, the occupied bandwidth of the target acceleration device changes. The target acceleration bandwidth needs to be subtracted from the occupied bandwidth before the configuration to obtain new occupied bandwidth, and the acceleration bandwidth stored in the storage unit 102 needs to be updated by using the new occupied bandwidth. The acceleration bandwidth of the target acceleration device is updated for the purpose of allowing the acceleration management node 100 to subsequently allocate, in real time according to current acceleration bandwidth of the target acceleration device, an acceleration device for a new invocation request from the client 300. In addition, the storage unit 102 may further be configured to record an allocation result of the instruction unit. The allocation result specifically indicates which acceleration device is configured for the client 300, and indicates acceleration device information and the like after the configuration, so that when subsequently finding during periodical monitoring that a service of the client 300 becomes abnormal, the acceleration management node can find an acceleration device corresponding to the abnormal service and release the acceleration device.

Further, in this embodiment, the acceleration management node 100 further includes a releasing unit 106, configured to obtain a release request from the client 300 for releasing the target acceleration device, and invoke the target acceleration node to release the target acceleration device. Still using the acceleration node 200c as an example, because the target acceleration device located on the acceleration node 200c is configured for the client 300, when the application program in the client 300 needs to release the acceleration device, the client 300 may instruct, by using a release request, the acceleration management node 100 to release the target acceleration device.

Still further, after the target acceleration device is released, the storage unit 102 is further configured to set the previously stored allocation result to invalid. Because the target acceleration device is already released, the allocation result of the target acceleration device also needs to be set to invalid, so as not to affect subsequent allocation of an acceleration device by the acceleration management node for the client.

Figure 3:
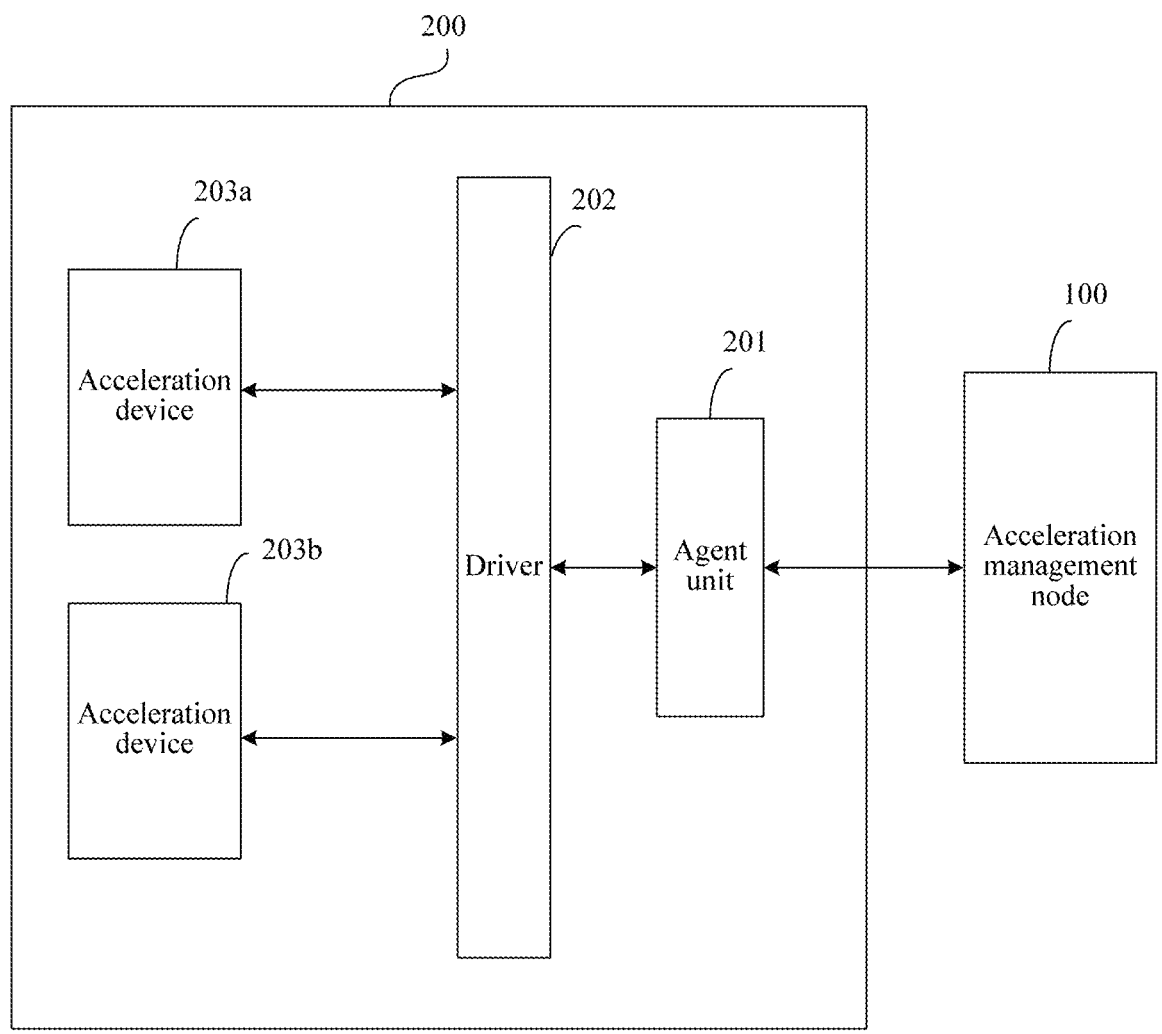
FIG. 3 is a schematic block diagram of an acceleration node according to an embodiment of the present application.

As shown in FIG. 3, an embodiment of the present application provides a schematic structural diagram of an acceleration node 200. The acceleration node 200 includes an agent unit 201, a driver 202, and at least one acceleration device. For example, 203a and 203b are used to respectively represent two acceleration devices, and an actual quantity of acceleration devices is not limited thereto. The driver 202 is configured to drive the acceleration devices 203a and 203b, and the acceleration devices 203a and 203b are each configured to provide a hardware acceleration function. The agent unit 201 is configured to:

invoke the driver 202 to separately query the at least one acceleration device to obtain acceleration device information of each acceleration device, where the acceleration device information includes an acceleration type and an algorithm type, and for example, the agent unit 201 may periodically invoke the driver 202 to query each interface on the acceleration devices 203a and 203b to obtain acceleration device information of the acceleration devices 203a and 203b; and report the obtained acceleration device information to the acceleration management node 100. Specifically, after obtaining the acceleration device information by query, the agent unit 201 may invoke the receiving unit 101 in the acceleration management node 100 in an RPC manner to report the acceleration device information to the acceleration management node 100.

In this embodiment, the acceleration node 200 may specifically be a physical host. The physical host may include a memory, a processor, and at least one acceleration device (also referred to as an accelerator). The acceleration device may be a processor, a GPU, an FPGA, a PCI device, or the like. The agent unit 201 and the driver 202 may be program instructions stored in the memory. The processor reads the program instructions in the memory to perform corresponding functions of the agent unit 201 and the driver 202.

In this embodiment, the acceleration device information further includes acceleration bandwidth.

In this embodiment, the acceleration node reports acceleration device information of its acceleration devices to an acceleration management node, so that the acceleration management node can configure an appropriate acceleration device for a client according to the reported acceleration device information, thereby meeting a service requirement and implementing accurate invocation.

Further, in this embodiment, the agent unit 201 is further configured to:

receive a configuration instruction message from the acceleration management node 100, where if the acceleration device information includes the acceleration type and the algorithm type, the configuration instruction message indicates a target acceleration type and a target algorithm type of a target acceleration device matching an invocation request of a client, or if the acceleration device information includes the acceleration type, the algorithm type, and the acceleration bandwidth, the configuration instruction message indicates a target acceleration type, a target algorithm type, and target acceleration bandwidth of a target acceleration device matching an invocation request of a client 300; invoke, according to the configuration instruction message, the driver 202 to detect whether the target acceleration device works normally; and when the target acceleration device works normally, configure a target interface of the target acceleration device for the client 300.

Further, in this embodiment, when the acceleration node 200 and the client 300 are a same physical host, and the physical host uses a multi-core architecture, the acceleration device information further includes non-uniform memory access architecture (NUMA) information. Correspondingly, the configuration instruction message further indicates target NUMA information matching the invocation request of the client.

The acceleration node reports NUMA information of each acceleration device to the acceleration management node 100, so that the acceleration management node 100 allocates an appropriate target acceleration device to the client 300 according to the NUMA information, so as to ensure that the service of the client and the target acceleration device are on a same NUMA, thereby improving read/write performance during storage.

When providing an acceleration function for the client 300, the acceleration device specifically communicates with the client 300 by using an interface of the acceleration device. An acceleration device may include one or more interfaces. During configuration, the agent unit 201 configures one of the interfaces as the target interface for the client.

Still further, the agent unit 201 is further configured to configure the target acceleration type, the target algorithm type, and the target acceleration bandwidth as a hardware attribute of the target interface. In the foregoing descriptions, after the target interface of the target acceleration device is configured for the client 300, the target acceleration device can provide an acceleration function for the client 300. In addition, if the acceleration bandwidth of the target acceleration device is not completely occupied, theoretically, the target acceleration device may also provide a hardware acceleration function for an application program of another client by using another interface. However, because the agent unit 201 configures the target acceleration device according to the configuration instruction message from the acceleration management node 100, and when determining the target acceleration device, the acceleration management node uses an acceleration device whose acceleration type and algorithm type are respectively the same as the target acceleration type and the target algorithm type and whose remaining bandwidth is greater than or equal to the target acceleration bandwidth as the target acceleration device, if a target acceleration device whose unoccupied bandwidth that is far greater than the target acceleration bandwidth required by the client, an acceleration capability of the target acceleration device is wasted. Therefore, in this embodiment, after configuring the target interface for the client 300, the agent unit 201 may further configure the target acceleration type, the target algorithm type, and the target acceleration bandwidth as the hardware attribute of the target interface. In this way, subsequently the agent unit 201 can periodically invoke the driver 202 to query various interfaces including the target interface of the target acceleration device and obtain an acceleration device attribute of the target acceleration device in real time, so that the acceleration management node 100 can allocate the target acceleration device to another client, thereby maximizing utilization of an acceleration capability of the target acceleration device.

In this embodiment, further, after the acceleration of the service of the client 300 is completed, the client 300 sends a release request for releasing the target acceleration device to the acceleration management node 100, so that the acceleration management node 100 invokes the agent unit 201 to release the target acceleration device. Therefore, the agent unit 201 is further configured to respond to the acceleration management node 100 and release the target acceleration device.

Still further, the agent unit 210 is further configured to set the hardware attribute of the target interface to null.

In the foregoing descriptions, to maximize the utilization of the acceleration capability of the target acceleration device, the agent unit 210 configures the target acceleration type, the target algorithm type, and the target acceleration bandwidth as the hardware attribute of the target interface. After responding to the acceleration management node 100 and releasing the target acceleration device, correspondingly, the agent unit 201 also needs to set the hardware attribute of the target interface to null to indicate that the target interface is unoccupied, so as to prevent the agent unit 201 from obtaining incorrect acceleration device information of the target acceleration device when the proxy unit 201 periodically queries the acceleration device information.

Figure 4:
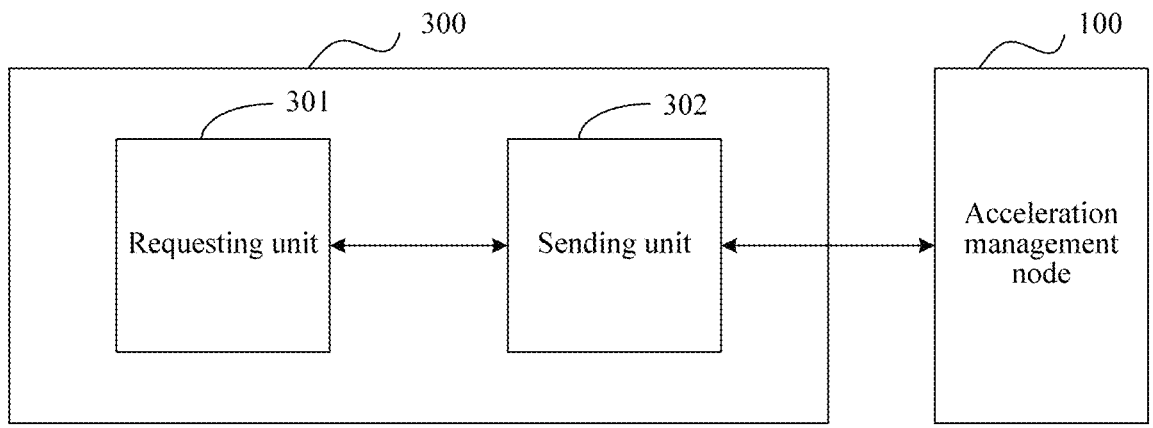
FIG. 4 is a schematic block diagram of a client according to an embodiment of the present application.

As shown in FIG. 4, an embodiment of the present application provides a schematic structural diagram of a client 300. The client 300 includes:

a requesting unit 301, configured to generate an invocation request according to an acceleration requirement of a service, where the invocation request includes a target acceleration type and a target algorithm type that are required for accelerating the service; and a sending unit 302, configured to send the invocation request to an acceleration management node to request to invoke a target acceleration device matching the invocation request to accelerate the service.

Further, the invocation request may further include target acceleration bandwidth required for accelerating the service.

Still further, the invocation request may further include target NUMA information required for accelerating the service.

In this embodiment, the client 300 may specifically be a physical host running an application program. The physical host may include a memory and a processor. The processor reads an application program in the memory to perform a corresponding function. The application program may be divided into a requesting unit 301 and a sending unit 302 according to functions. The requesting unit 301 generates a corresponding invocation request according to an acceleration requirement of a service (that is, some functions of the application program) that needs to be offloaded to hardware for acceleration. The invocation request specifically includes a target acceleration type, a target algorithm type, and target acceleration bandwidth that are required for accelerating the service, or may further include target NUMA information. The sending unit 302 feeds back the invocation request to the acceleration management node 100 by using a communications interface between the sending unit 302 and the acceleration management node 100, so as to apply to the acceleration management node 100 for a target acceleration device matching the invocation request.

By means of the solution of this embodiment of the present application, an application program of a client may send, to an acceleration management node, a target acceleration type, a target algorithm type, and target acceleration bandwidth that correspond to an acceleration device that meets a requirement of accelerating a service of the application program, to apply to the acceleration management node for the acceleration device, so that the acceleration management node can more accurately invoke a target acceleration device required by the client. In addition, because an acceleration type, an algorithm type, acceleration bandwidth, and target NUMA information of the target acceleration device invoked by the acceleration management node are consistent with the target acceleration type, the target algorithm type, the target acceleration bandwidth, and the target NUMA information for which the client applies, normal running of the service can be ensured.

Further, the requesting unit 301 is further configured to: when the acceleration of the service is completed, generate a release request for releasing the target acceleration device.

The sending unit 302 is further configured to send the release request to the acceleration management node 100, so that the acceleration management node invokes a target acceleration node on which the target acceleration device is located to release the target acceleration device.

That is, after the acceleration of the service of the application program of the client is completed, the acceleration management node needs to be instructed to release a corresponding target acceleration device, so as to avoid unnecessary occupation of the target acceleration device.

Figure 5:
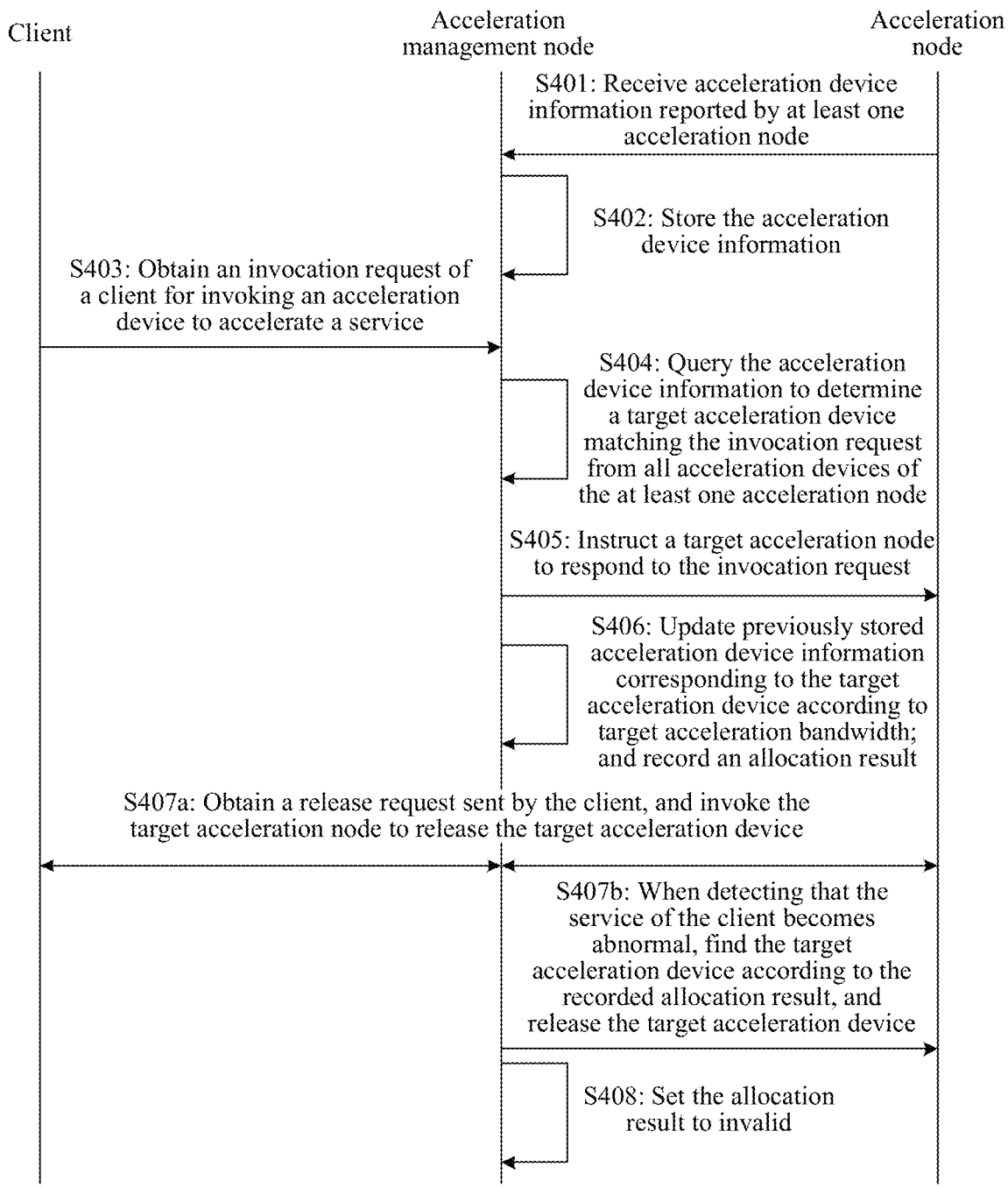
FIG. 5 is a flowchart of an acceleration management method according to an embodiment of the present application.
Figure 6:
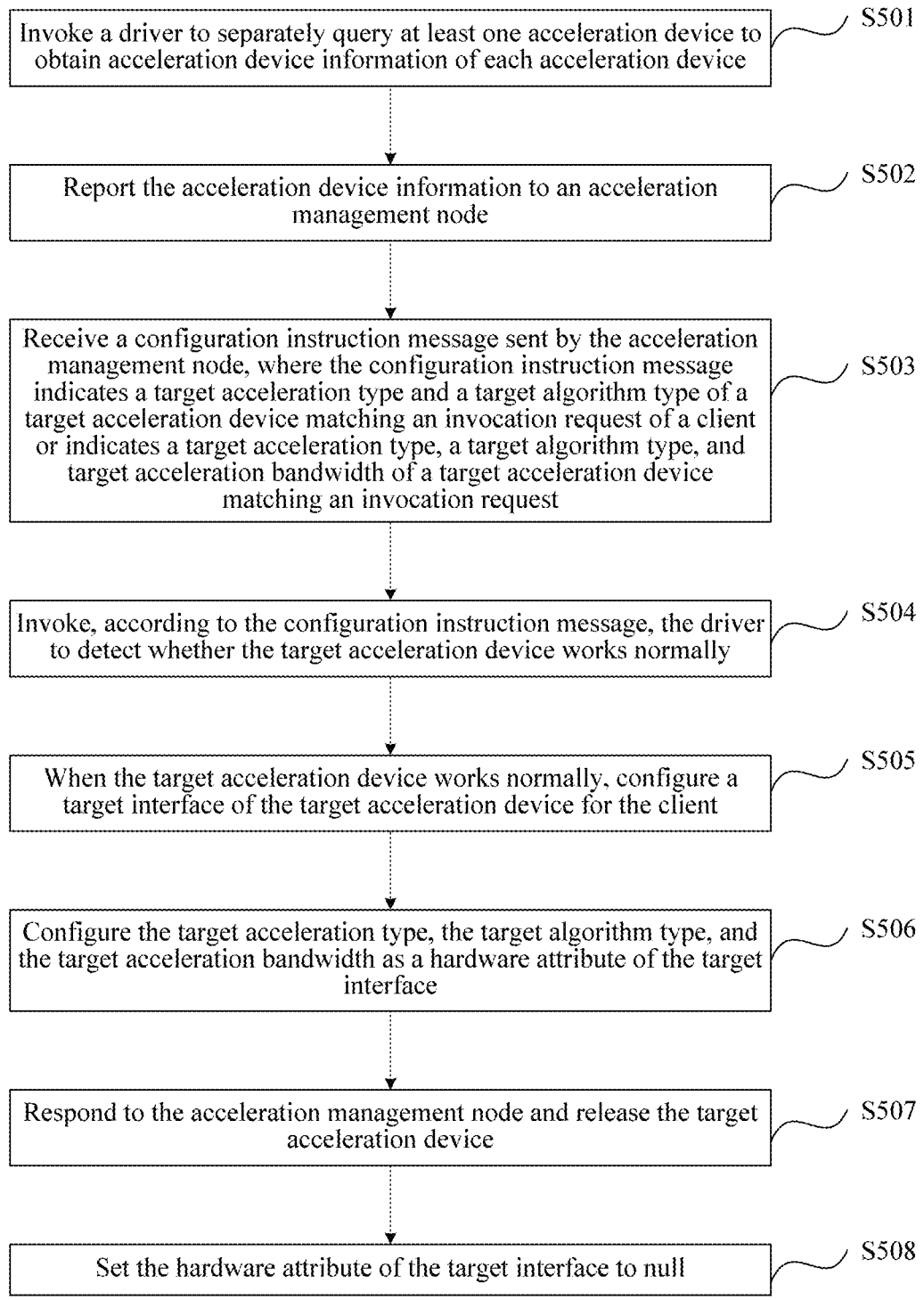
FIG. 6 is a flowchart of an acceleration device configuration method according to an embodiment of the present application.
Figure 7:
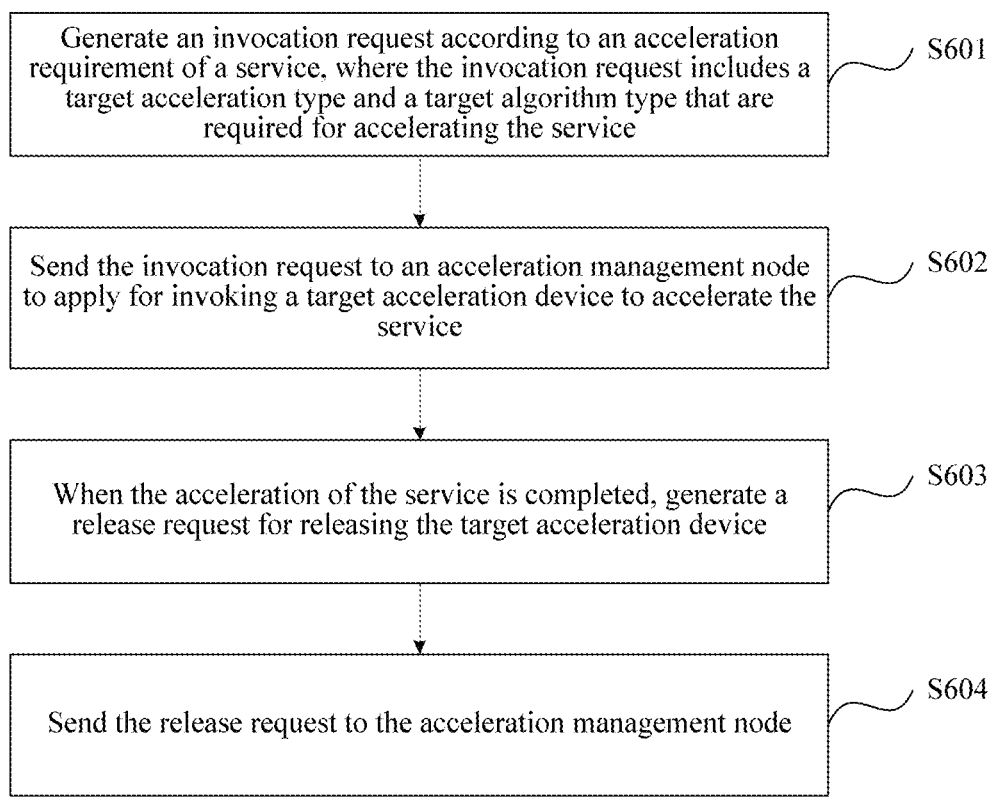
FIG. 7 is a flowchart of a method of applying for an acceleration device according to an embodiment of the present application.

Method embodiments of the present application are briefly described below with reference to FIG. 5 to FIG. 7. The method embodiments shown in FIG. 5 to FIG. 7 are in a one-to-one correspondence with the apparatus embodiments shown in FIG. 2 to FIG. 4. Therefore, reference can be made to each other, and certain descriptions are not repeated below.

As shown in FIG. 5, an embodiment of the present application provides a flowchart of an acceleration management method. The method is applied to an acceleration management node (refer to FIG. 2). The method may include the following steps.

S401: Separately receive acceleration device information of all acceleration devices of each of at least one acceleration node reported by the acceleration node, where each acceleration node includes at least one acceleration device, and the acceleration device information includes an acceleration type and an algorithm type.

S402: Store the acceleration device information. S402 is optional because a receiving unit that receives the acceleration device information may have a cache capability.

S403: Obtain an invocation request from a client, where the invocation request is used to invoke an acceleration device to accelerate a service of the client, and the invocation request includes a target acceleration type and a target algorithm type.

S404: Query the acceleration device information to determine, from all the acceleration devices of the at least one acceleration node, a target acceleration device matching the invocation request.

S405: Instruct a target acceleration node on which the target acceleration device is located to respond to the invocation request, so that the target acceleration node configures the target acceleration device for the client. For example, the acceleration management node may send a configuration instruction message to the target acceleration node where the configuration instruction message is used to instruct the target acceleration node to configure the target acceleration device for the client.

More specifically, S404 may include: querying the acceleration device information to determine, from all the acceleration devices of the at least one acceleration node, the target acceleration device whose acceleration type and algorithm type are respectively the same as the target acceleration type and the target algorithm type.

In this embodiment, by obtaining acceleration device information of each acceleration node and invoking an acceleration device, an acceleration management node may allocate, according to a requirement of an application program of a client and an acceleration type and an algorithm type of each acceleration device, a corresponding acceleration device to the application program, thereby implementing correct invocation and ensuring normal running of the accelerated service.

Further, the acceleration information further includes acceleration bandwidth. The acceleration bandwidth of each acceleration device includes total bandwidth and occupied bandwidth. Correspondingly, the invocation request further includes target acceleration bandwidth.

S404 may specifically include:

querying the acceleration device information to determine, from all the acceleration devices of the at least one acceleration node, at least one candidate acceleration device whose acceleration type and algorithm type are respectively the same as the target acceleration type and the target algorithm type and whose remaining bandwidth is greater than or equal to the target acceleration bandwidth, and determining one of the at least one candidate acceleration device as the target acceleration device, where the remaining bandwidth is obtained by calculation according to the total bandwidth and the occupied bandwidth.

Still further, the acceleration device information received in S401 may further include NUMA information. The invocation request obtained in S403 may further include target NUMA information. S404 may specifically include:

querying the acceleration device information to determine, from all the acceleration devices of the at least one acceleration node, at least one candidate acceleration device whose acceleration type and algorithm type are respectively the same as the target acceleration type and the target algorithm type, whose remaining bandwidth is greater than or equal to the target acceleration bandwidth, and whose NUMA information is consistent with the target NUMA information, and determining one of the at least one candidate acceleration device as the target acceleration device, where the remaining bandwidth is obtained by calculation according to the total bandwidth and the occupied bandwidth.

Further, the determining one of the at least one candidate acceleration device as the target acceleration device in S404 may include:

when there is one candidate acceleration device, determining the candidate acceleration device as the target acceleration device;

when there is a plurality of candidate acceleration devices, determining a first acceleration device having maximum remaining bandwidth from the plurality of candidate acceleration devices according to the acceleration bandwidth, and if there is one first acceleration device, determining the first acceleration device as the target acceleration device bandwidth, where the remaining bandwidth of the candidate acceleration device may be obtained by calculation according to the total bandwidth and the occupied bandwidth;

when there is a plurality of candidate acceleration devices, and there is a plurality of first acceleration devices having the maximum remaining bandwidth in the plurality of the candidate acceleration devices, determining a second acceleration device having a maximum VF quantity from the plurality of first acceleration devices, and if there is one second acceleration device, using the second acceleration device as the target acceleration device, where in S401, the acceleration device information received by the acceleration management node includes a VF quantity that is supported by each acceleration device in the acceleration node and that is reported by the acceleration node; or when there is a plurality of candidate acceleration devices, and there is a plurality of first acceleration devices having the maximum remaining bandwidth in the plurality of the candidate acceleration devices, if there is a plurality of second acceleration devices having the maximum VF quantity, using a second acceleration device first found as the target acceleration device according to a time sequence of querying the acceleration device information.

In this embodiment, for example, S405 may include: sending a configuration instruction message to the target acceleration node, to instruct the target acceleration node to respond to the invocation request. The configuration instruction message is used to instruct the target acceleration node to configure the target acceleration device for the client. The configuration instruction message may specifically indicate an acceleration type and an algorithm type of the target acceleration device matching the invocation request, or the configuration instruction message indicates an acceleration type, an algorithm type, and acceleration bandwidth of the target acceleration device.

In this embodiment, the method may further include:

S406: Update previously stored acceleration device information corresponding to the target acceleration device according to the target acceleration bandwidth; and record an allocation result, where the allocation result indicates which acceleration device is allocated as the target acceleration device to the client by the acceleration management node according to the invocation request. If the acceleration device information only includes the acceleration type and the algorithm type, only the allocation result of the acceleration management node is recorded in S406.

S406 may be performed after S405 or may be performed at the same time as S405. No limitation is imposed herein.

Further, the method further includes:

Step 407a: Obtain a release request from the client for releasing the target acceleration device, and invoke the target acceleration node to release the target acceleration device.

Alternatively, S407b: When detecting that the service of the client becomes abnormal, find the target acceleration device according to the recorded allocation result, and invoke the target acceleration node to release the target acceleration device. The acceleration management node may periodically monitor whether a service for which each client applies for acceleration runs normally. If a service becomes abnormal, the acceleration management node may find, according to the allocation result recorded in S406, a target acceleration device configured for the abnormal service, and invoke a target acceleration node on which the target acceleration device is located to release the target acceleration device, so as to prevent the target acceleration device from unnecessary operation after the service becomes abnormal.

Still further, after S407a or S407b, the method further includes:

S408: Set the allocation result to invalid.

Because the target acceleration device is already released, the allocation result of the target acceleration device also needs to be set to invalid, so as not to affect subsequent allocation of an acceleration device by the acceleration management node for the client.

As shown in FIG. 6, an embodiment of the present application further provides a flowchart of an acceleration device configuration method. The method is applied to an acceleration node (refer to FIG. 3). The acceleration node includes a driver and at least one acceleration device. The method includes the following steps.

S501: Invoke the driver to separately query the at least one acceleration device to obtain acceleration device information of each acceleration device. The acceleration device information includes an acceleration type and an algorithm type.

S502: Report the acceleration device information to an acceleration management node.

In this embodiment, an acceleration node reports acceleration device information of its acceleration devices to an acceleration management node, so that the acceleration management node can configure an appropriate acceleration device for a client according to the reported acceleration device information, thereby meeting a service requirement and implementing accurate invocation.

Further, the acceleration device information may further include acceleration bandwidth.

Further, in this embodiment, the method further includes the following steps.

S503: Receive a configuration instruction message from the acceleration management node. If the acceleration device information includes the acceleration type and the algorithm type, the configuration instruction message indicates a target acceleration type and a target algorithm type of a target acceleration device matching the invocation request of the client. If the acceleration device information includes the acceleration type, the algorithm type, and the acceleration bandwidth, the configuration instruction message indicates a target acceleration type, a target algorithm type, and target acceleration bandwidth of a target acceleration device matching the invocation request of the client.

S504: Invoke, according to the configuration instruction message, the driver to detect whether the target acceleration device works normally.

S505: When the target acceleration device works normally, configure a target interface of the target acceleration device for the client.

After the target interface of the target acceleration device is configured for the client, the application program of client can invoke the target interface and run a service to be accelerated of the application program.

When the acceleration node uses a multi-processor architecture, acceleration devices may be grouped according to processors to which the acceleration devices respectively belong. Therefore, in step S501, the acceleration device information may further include NUMA information. The NUMA information may indicate a grouping status of each acceleration device.

Correspondingly, the configuration instruction message received in step S503 may further indicate target NUMA information matching the invocation request of the client.

S506: Configure the target acceleration type, the target algorithm type, and the target acceleration bandwidth as a hardware attribute of the target interface. By means of the configuration of the hardware attribute of the target interface, the acceleration node can subsequently query the remaining acceleration bandwidth of the target acceleration device, so that the acceleration management node can allocate the target acceleration device to another client, thereby maximizing utilization of an acceleration capability of the target acceleration device.

S507: Respond to the acceleration management node and release the target acceleration device.

S508: Set the hardware attribute of the target interface to null.

As shown in FIG. 7, an embodiment of the present application further provides a flowchart of a method of applying for an acceleration device. The method is applied to a client. The method includes the following steps.

S601: Generate an invocation request according to an acceleration requirement of a service. The invocation request includes a target acceleration type and a target algorithm type that are required for accelerating the service.

S602: Send the invocation request to an acceleration management node to request to invoke a target acceleration device matching the invocation request to accelerate the service. The acceleration management node invokes a target acceleration device according to the target acceleration type and the target algorithm type, so that an acceleration type and an algorithm type of the target acceleration device match the acceleration requirement of the service of the client, thereby implementing accurate invocation.

Further, in step S601, if acceleration device information reported by an acceleration node to the acceleration management node includes acceleration bandwidth, the invocation request generated by the client further includes target acceleration bandwidth required for accelerating the service.

In this embodiment, an application program of a client may send, to an acceleration management node, a target acceleration type, a target algorithm type, and target acceleration bandwidth that correspond to an acceleration device that meets a requirement of accelerating a service of the application program. The application program applies to the acceleration management node for the acceleration device, so that the acceleration management node can more accurately invoke a target acceleration device required by the client, and ensure normal running of the service.

In this embodiment, when the acceleration node uses a multi-processor architecture, acceleration devices in the acceleration node may be grouped according to NUMA information. Therefore, the invocation request may further include target NUMA information required by the service, so that the service and the target acceleration device required by the service are configured on a same NUMA. In this embodiment, the client and the acceleration node may actually be a same physical host, and the application program and the agent unit in the acceleration node are different processes or different software modules. Therefore, configuring the service and target acceleration device on a same NUMA can ensure that the service and the target acceleration device read a memory in the same NUMA, thereby improving read performance.

S603: When the acceleration of the service is completed, generate a release request for releasing the target acceleration device.

S604: Send the release request to the acceleration management node.

After the acceleration of the service of the application program of the client is completed, the client may instruct, by performing steps S603 and S604, the acceleration management node to release the corresponding target acceleration device, so as to avoid unnecessary occupation of the target acceleration device.

An embodiment of the present application further provides an acceleration management system. Referring to FIG. 1, the acceleration management system includes an acceleration management node 100 and at least one acceleration node 200. For the acceleration management node 100, refer to the acceleration management node shown in FIG. 2 and the corresponding embodiment. For the acceleration node 200, refer to the acceleration node shown in FIG. 3 and the corresponding embodiment. Details are not described herein again. The acceleration management system provided by this embodiment of the present application can accurately invoke, according to a service requirement of an application program of a client, an appropriate acceleration device to accelerate the service of the application program, and ensure normal running of the service.

It is understood that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read-only memory (ROM), a random access memory (RAM), a magnetic disk, or an optical disc.

Finally, the foregoing embodiments are merely intended for describing the technical solutions of the present application, but not for limiting the present application. Although the present application is described in detail with reference to the foregoing embodiments, persons of ordinary skill in the art may make modifications to the technical solutions described in the foregoing embodiments or make equivalent replacements to some or all technical features thereof, without departing from the scope of the present application.

What is claimed is:

1. An acceleration management node, comprising:
a memory configured to store program instructions; and
a processor coupled to the memory, and, by executing the instructions, configured to:
receive, from each acceleration node, information of at least one acceleration device on the acceleration node, wherein the information of each of the at least one acceleration device comprises information indicating an algorithm type, an acceleration bandwidth or non-uniform memory access architecture (NUMA) information;
receive an invocation request from a client, wherein the invocation request requests an acceleration device to accelerate a service of the client, and wherein the invocation request comprises an acceleration requirement;
determine a target acceleration device, wherein information of the target acceleration device matches the acceleration requirement in the invocation request received from the client, the information of each of the at least one acceleration device comprises the information indicating the algorithm type, and an algorithm type indicated by the information of the target acceleration device is matched with an algorithm type indicated by the acceleration requirement in the invocation request received from the client; and
instruct a target acceleration node, to which the target acceleration device belongs, to respond to the invocation request.

2. The acceleration management node according to claim 1, wherein the information of each of the at least one acceleration device comprises the information indicating the acceleration bandwidth, and the acceleration bandwidth comprises a total bandwidth and an occupied bandwidth; and
the processor is further configured to:
determine the target acceleration device, wherein a remaining bandwidth of the target acceleration device is greater than or equal to a target acceleration bandwidth indicated by the acceleration requirement, wherein the remaining bandwidth is the total bandwidth minus the occupied bandwidth.

3. The acceleration management node according to claim 2, wherein the processor is further configured to:
determine the target acceleration device, wherein, when there are more than one acceleration device whose remaining bandwidth is greater than or equal to the target acceleration bandwidth indicated by the acceleration requirement, one acceleration device that has a maximum remaining bandwidth is determined to be the target acceleration device.

4. The acceleration management node according to claim 1, wherein the processor is further configured to:
   determine the target acceleration device, wherein, when there are more than one acceleration device that meet the acceleration requirement, one acceleration device that has a maximum quantity of virtual functions is determined to be the target acceleration device.

5. The acceleration management node according to claim 1, wherein the processor is further configured to:
   determine the target acceleration device, wherein, when there are more than one acceleration device that meet the acceleration requirement, one acceleration device that is first found according to a time sequence of querying the information of the at least one acceleration device is determined to be the target acceleration device.

6. The acceleration management node according to claim 1, wherein the information of each of the at least one acceleration device comprises the NUMA information; and wherein the processor is further configured to:
   determine the target acceleration device, wherein NUMA information of the target acceleration device is consistent with NUMA information indicated by the acceleration requirement from the client.

7. The acceleration management node according to claim 1, wherein the processor is configured to:
   send a configuration instruction message to the target acceleration node, to instruct the target acceleration node to respond to the invocation request,
   wherein the configuration instruction message indicates an acceleration type of the target acceleration device and further indicates an algorithm type, an acceleration bandwidth or NUMA information of the target acceleration device.

8. The acceleration management node according to claim 1, wherein the memory is further configured to store the information of the at least one acceleration device of each acceleration node, and the processor is further configured to update the information of the at least one acceleration device of each acceleration node stored in the memory; or store an allocation result for the target acceleration device.

9. The acceleration management node according to claim 8, wherein the processor is further configured to:
   find the target acceleration device associated with the service according to the allocation result stored in the memory when detecting that the service of the client becomes abnormal; and
   instruct the target acceleration node to release the target acceleration device.

10. The acceleration management node according to claim 1, wherein the processor is further configured to:
    receive a release request from the client for releasing the target acceleration device; and
    instruct the target acceleration node to release the target acceleration device.

11. A method for managing acceleration resource performed by an acceleration management node, comprising:
    receiving, from each acceleration node, information of at least one acceleration device on the acceleration node, wherein information of each of the at least one acceleration device comprises information indicating an algorithm type, an acceleration bandwidth or non-uniform memory access architecture (NUMA) information;
    receiving an invocation request from a client, wherein the invocation request requests an acceleration device to accelerate a service of the client, and wherein the invocation request comprises an acceleration requirement;
    determining a target acceleration device, wherein information of the target acceleration device matches the acceleration requirement in the invocation request received from the client, the information of each of the at least one acceleration device comprises the information indicating the algorithm type, and an algorithm type indicated by the information of the target acceleration device is matched with an algorithm type indicated by the acceleration requirement in the invocation request received from the client; and
    instructing a target acceleration node, to which the target acceleration device belongs, to respond to the invocation request.

12. The method according to claim 11, wherein the information of each of the at least one acceleration device comprises the information indicating the acceleration bandwidth, and the acceleration bandwidth comprises a total bandwidth and an occupied bandwidth; and the method further comprises:
    determining the target acceleration device, wherein a remaining bandwidth of the target acceleration device is greater than or equal to a target acceleration bandwidth indicated by the acceleration requirement, wherein the remaining bandwidth is the total bandwidth minus the occupied bandwidth.

13. The method according to claim 12, further comprising:
    determining the target acceleration device, wherein, when there are more than one acceleration device whose remaining bandwidth is greater than or equal to the target acceleration bandwidth indicated by the acceleration requirement, one acceleration device that has a maximum remaining bandwidth is determined to be the target acceleration device.

14. The method according to claim 11, further comprising:
    determining the target acceleration device, wherein, when there are more than one acceleration device that meet the acceleration requirement, one acceleration device that has a maximum quantity of virtual functions is determined to be the target acceleration device.

15. The method according to claim 11, further comprising:
    determining the target acceleration device, wherein, when there are more than one acceleration device that meet the acceleration requirement, one acceleration device that is first found according to a time sequence of querying the information of the at least one acceleration device is determined to be the target acceleration device.

16. The method according to claim 11, wherein the information of each of the at least one acceleration device comprises the NUMA information; and
    the method further comprises: determining the target acceleration device, wherein NUMA information of the target acceleration device is consistent with NUMA information indicated by the acceleration requirement from the client.

17. The method according to claim 11, further comprising:
    sending a configuration instruction message to the target acceleration node, to instruct the target acceleration node to respond to the invocation request, wherein the configuration instruction message indicates an acceleration type of the target acceleration device and further indicates an algorithm type, an acceleration bandwidth or NUMA information of the target acceleration device.

18. A non-transitory storage medium, storing instructions that, when performed by one or more processors, cause the one or more processors to:
receive, from each acceleration node, information of at least one acceleration device on the acceleration node, wherein information of each of the at least one acceleration device comprises information that indicates an algorithm type, an acceleration bandwidth or non-uniform memory access architecture (NUMA) information;
receive an invocation request from a client, wherein the invocation request requests an acceleration device to accelerate a service of the client, and wherein the invocation request comprises an acceleration requirement;
determine a target acceleration device, wherein information of the target acceleration device matches the acceleration requirement in the invocation request received from the client, the information of each of the at least one acceleration device comprises the information indicating the algorithm type, and an algorithm type indicated by the information of the target acceleration device is matched with an algorithm type indicated by the acceleration requirement in the invocation request received from the client; and
instruct a target acceleration node, to which the target acceleration device belongs, to respond to the invocation request.

* * * * *